United States Patent
Bakshi et al.

(10) Patent No.: US 7,690,968 B2
(45) Date of Patent: Apr. 6, 2010

(54) AQUEOUS FLUID COMPOSITIONS FOR ABRASIVE SLURRIES, METHODS OF PRODUCTION, AND METHODS OF USE THEREOF

(75) Inventors: Abhaya K. Bakshi, Westford, MA (US); Jason A. Sherlock, Anaheim, CA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 11/897,550

(22) Filed: Aug. 29, 2007

(65) Prior Publication Data

US 2008/0057833 A1 Mar. 6, 2008

Related U.S. Application Data

(60) Provisional application No. 60/841,580, filed on Aug. 30, 2006.

(51) Int. Cl.
*B24B 1/00* (2006.01)
(52) U.S. Cl. .............................. 451/36; 51/308; 51/307; 438/693
(58) Field of Classification Search .................. 451/36, 451/41, 909; 51/298, 307, 308, 309; 438/692, 438/693; 216/88, 89, 103; 257/E21.304, 257/E21.583
See application file for complete search history.

(56) References Cited

U.S. PATENT DOCUMENTS

| | | | |
|---|---|---|---|
| 6,149,830 A * | 11/2000 | Lin et al. ....................... | 216/89 |
| 6,568,384 B1 | 5/2003 | Onizaki et al. | |
| 7,402,261 B2 * | 7/2008 | So et al. ..................... | 252/79.1 |
| 2002/0129559 A1 * | 9/2002 | Ito et al. ....................... | 51/307 |
| 2004/0014319 A1 * | 1/2004 | Sahota et al. ................ | 438/692 |
| 2004/0224521 A1 * | 11/2004 | Flake et al. .................. | 438/692 |
| 2005/0100741 A1 * | 5/2005 | Smith et al. .............. | 428/423.1 |
| 2006/0075687 A1 * | 4/2006 | Tsuruta et al. ................ | 51/307 |
| 2007/0017902 A1 * | 1/2007 | Petitdidier et al. ............ | 216/88 |
| 2007/0155178 A1 * | 7/2007 | Park et al. ................... | 438/692 |

FOREIGN PATENT DOCUMENTS

| | | | |
|---|---|---|---|
| WO | WO 9320139 A1 * | 10/1993 | |
| WO | WO 00/14153 A | 3/2000 | |

OTHER PUBLICATIONS

Written Opinion for International Patent Application No. PCT/US2007/018911 (10 pages).
International Search Report for International Patent Application No. PCT/US2007/018911 (8 pages).
Allen A. Steuter et al. "Water Potential of Aqueous Polyethelene Glycol" Plant Physiology, vol. 67, 1981, pp. 64-67, XP002466343 p. 64.

* cited by examiner

*Primary Examiner*—Eileen P. Morgan
(74) *Attorney, Agent, or Firm*—Edwards Angell Palmer & Dodge LLP; Peter F. Corless; Lisa Swiszcz

(57) ABSTRACT

Aqueous slurry compositions for use in loose-abrasive machining processes, particularly aqueous abrasive slurries for use in wire saw processes. These aqueous slurry compositions comprise abrasive particles uniformly and stably dispersed in lubricant, which comprises a combination of a vehicle and water, particularly PEG and water.

28 Claims, 2 Drawing Sheets

AQUEOUS FLUID COMPOSITIONS FOR ABRASIVE SLURRIES, METHODS OF PRODUCTION, AND METHODS OF USE THEREOF

The present application claims the benefit of U.S. provisional application No. 60/841,580, filed Aug. 30, 2006, which is incorporated herein by reference in its entirety.

BACKGROUND

1. Field of the Invention

The present invention generally relates to aqueous fluid compositions for use in forming abrasive slurries. The aqueous fluid compositions are useful for forming loose-abrasive machining slurries and, more particularly, wire saw slurries.

2. Background

Wire saws are extensively used to slice silicon for solar and electronics applications. They are also used for slicing a variety of other compound semiconductor materials including sapphire, GaAs, InP, and SiC, optical materials such as quartz glass and crystal, and hard and brittle materials such as ceramics.

A wire saw generally includes a plurality of wires oriented under tension. The wires are driven simultaneously as an abrasive slurry is supplied between the wires and workpiece. The workpiece is forced through the wires as the slurry acts to abrade the workpiece into a plurality of pieces. This method allows for the production of large numbers of sliced pieces of particular thickness, flatness, and surface smoothness.

During wire saw cutting, the wire does not do the cutting, but rather it acts to transport the abrasive slurry, which does the cutting. This type of process is called "loose-abrasive machining." Other examples of loose-abrasive machining include ultrasonic machining, water-jet cutting, and sandblasting.

The slurry is a suspension of abrasive particles in a fluid composition, also sometimes referred to as a "lubricant", "vehicle" or "carrier". As the abrasives, materials such as silicon carbide (SiC), diamond, and boron carbide ($B_4C$) have been used. Nonaqueous slurries have been employed, wherein the fluid composition predominantly contains mineral oil in which the abrasives are dispersed at a ratio of about 1:1 based on weight. Water soluble slurries have also been employed, wherein the fluid composition predominantly contains a water soluble glycol (e.g., polyethylene glycol (PEG), ethylene glycol, and polyoxyethylene glycol) in which the abrasive particles are dispersed.

While mineral oil provides good lubricating and cutting properties, it possesses poor cooling performance. Further, because mineral oil is not water soluble, organic solvents and specialized detergents are required to clean the mineral oil from the cut pieces. Due to poor cooling performance, disposal restrictions, and post cleaning difficulties, alternatives to mineral oil are needed.

While glycols, such as PEG, offer some benefits over mineral oil, these materials are very costly and they present problems with the amounts and methods of disposal available. Further, glycols have high viscosities that lead to increased drag forces on the wafer. Such high drag forces can lead to breakage of cut pieces during thin slicing.

It would, thus, be highly desirable to develop improved fluid compositions for use in forming abrasive slurries, particularly wire saw slurries.

SUMMARY

This invention provides a fluid composition for use in forming loose-abrasive machining slurries. Abrasive particles can be dispersed in the fluid compositions so as to provide a working slurry composition useful in loose-abrasive machining processes. As used herein, a "working slurry composition" or "working abrasive slurry" is any slurry composition that contains abrasive particles dispersed within the fluid composition, wherein the abrasive particles are present at a concentration that is suitable for a given loose-abrasive machining process. The fluid compositions of the present invention provide excellent lubricating and machining/cutting properties. The concentration of the components can be adjusted depending on the desired application to minimize product breakage during machining. The fluid compositions are further cost effective, possess enhanced heat dissipation properties, and provide easier and less limited post-cutting disposal options.

In one aspect, the invention generally relates to a fluid composition for use in forming a loose-abrasive machining slurry comprising polyethylene glycol and water, wherein the composition comprises at least 10 vol % water.

Embodiments according to this aspect of the invention can include the following features. The composition can comprise about 15 vol % to about 80 vol % of polyethylene glycol (PEG) and about 20 vol % to 85 vol % water. In some embodiments, the composition comprises about 20 vol % to about 75 vol % PEG, about 25 vol % to about 70 vol % PEG, about 30 vol % to about 65 vol % PEG, about 35 vol % to about 60 vol % PEG, or about 40 vol % to about 55 vol % PEG. In some embodiments, the composition comprises about 25 vol % to about 80 vol % water, about 30 vol % to about 75 vol % water, about 40 vol % to about 70 vol % water, or about 50 vol % to about 60 vol % water. The water can be deionized. The composition can further comprise one or more viscosity modifier. The viscosity modifiers can be selected from conventional viscosity modifiers such as synthetic clay, natural clay, Carbopols®, carboxymethylcellulose, ethylcellulose, gelatin, hydroxyethylcellulose, hydroxypropyl cellulose, methylcellulose, polyvinyl alcohol, and xanthan gum. The viscosity modifiers can be added so as to provide a composition having a viscosity ranging from about 5 cps to about 100 cps. In some embodiments, the composition contains up to about 10 vol % of one or more viscosity modifier, and in some embodiments from about 0.1 to about 10 vol % of one or more viscosity modifier. The composition can further comprise one or more activator. In some embodiments, the composition contains up to about 5 vol % of one or more activator, and in some embodiments about 0.2 vol % to about 5 vol % of one or more activator. The activator can be selected from conventional activators such as triethanolamine and amine borate. The composition can further comprise one or more rust inhibitors. The rust inhibitors can be selected from conventional rust inhibitors such as triethanolamine and carboxylic salts. In some embodiments, the composition contains from about 0.1 vol % to about 5 vol % of one or more rust inhibitor.

In another aspect, the invention generally relates to a method for forming a fluid composition suitable for use in forming a loose-abrasive machining slurry comprising mixing polyethylene glycol and water such that the composition contains at least 10 vol % water.

In another aspect, the invention generally relates to a method for using a fluid composition comprising polyethylene glycol and at least 10 vol % water in a wire saw process. The method comprises providing the fluid composition, uniformly dispersing abrasive particles within the fluid composition to form a working slurry, and supplying the working slurry to a wire saw process.

In another aspect, the invention generally relates to a fluid composition suitable for use in reciprocal cutting by a wire saw comprising polyethylene glycol and at least 10 vol % water.

In another aspect, the invention generally relates to a method for providing a fluid composition suitable for use in reciprocal wire saw cutting comprising providing a fluid composition comprising polyethylene glycol and at least 10% water, uniformly dispersing abrasive particles within the fluid composition to form a working slurry, and modifying the viscosity of the working slurry as needed for reciprocal cutting by adding water.

In another aspect, the invention generally relates to a method for dissipating heat during a machining process comprising supplying a working slurry to the machining process, the working slurry comprising polyethylene glycol, at least 10 vol % water, and abrasive particles uniformly dispersed in the polyethylene glycol and water, wherein at least a portion of the water evaporates to dissipate heat, and replenishing the working fluid with water during the machining process to further dissipate heat.

In another aspect, the invention generally relates to a fluid composition for use in forming a loose-abrasive machining slurry comprising polyethylene glycol and water, wherein water is present in the fluid composition in an amount such that the viscosity of a working slurry formed by dispersing abrasive particles within the fluid composition reduced by at least 1.5 times.

Embodiments according to this aspect of the invention can include the following features. Water can be present in the fluid composition in an amount such that the viscosity of a working slurry formed by dispersing abrasive particles within the fluid composition is reduced by at least 2 times, at least 2 times, at least 2.5 times, at least 3 times at least 3.5 times, at least 4 times, at least 4.5 times, at least 5 times, at least 5.5 times, at least 6 times, at least 6.5 times, at least 7 times, at least 7.5 times, at least 8 times, at least 8.5 times, at least 9 times, at least 9.5 times, and even 10 times.

In another aspect, the invention generally relates to a fluid composition for use in forming a loose-abrasive machining slurry comprising polyethylene glycol and water, wherein the viscosity of a working slurry formed by dispersing abrasive particles, at a solids content C %, within the fluid composition is reduced by the addition of water, such that the viscosity of the working slurry is at least 1.5 times less than a slurry composition comprising PEG and abrasive particles at solids content C %.

Embodiments according to this aspect of the invention can include the following features. The abrasive particles in the working slurry can have the same grit size as the abrasive particles in the slurry composition comprising PEG and abrasive particles. The abrasive particles in the working slurry can have a smaller grit size than the abrasive particles in the slurry composition comprising PEG and abrasive particles. The abrasive particles in the working slurry can have a larger grit size than the abrasive particles in the slurry composition comprising PEG and abrasive particles. The viscosity of the working slurry can be at least 2 times less, at least 2.5 times less, at least 3 times less, at least 3.5 times less, at least 4 times less, at least 4.5 times less, at least 5 times less, at least 5.5 times less, at least 6 times less, at least 6.5 times less, at least 7 times less, at least 7.5 times less, at least 8 times less, at least 8.5 times less, at least 9 times less, at least 9.5 times less, and even 10 times less than a slurry composition comprising at least 60 volume percent polyethylene glycol and abrasive particles at solids content 20 volume percent.

In another aspect, the invention generally relates to a fluid composition for use in forming a loose-abrasive machining slurry comprising polyethylene glycol and water, wherein water is present in the fluid composition in an amount such that, during a machining process, the temperature of a working slurry formed by dispersing abrasive particles within the fluid composition is reduced by at least 2° C.

Embodiments according to this aspect of the invention can include the following features. The temperature of a working slurry formed by dispersing abrasive particles within the fluid composition can be reduced by at least 3° C., at least 4° C., at least 5° C., at least 6° C., at least 7° C., at least 8° C., at least 9° C., at least 10° C., at least 11° C., at least 12° C., at least 13° C., and even 14° C.

In another aspect, the invention generally relates to a fluid composition for use in forming a loose-abrasive machining slurry comprising polyethylene glycol and water, wherein, during a machining process, the temperature of a working slurry formed by dispersing abrasive particles, at a solids content C %, within the fluid composition is reduced by the addition of water, such that the temperature of the working slurry is at least 2° C. times less than a slurry composition comprising PEG and abrasive particles at solids content C %.

Embodiments according to this aspect of the invention can include the following features. The abrasive particles in the working slurry can have the same grit size as the abrasive particles in the slurry composition comprising PEG and abrasive particles. The abrasive particles in the working slurry can have a smaller grit size than the abrasive particles in the slurry composition comprising PEG and abrasive particles. The abrasive particles in the working slurry can have a larger grit size than the abrasive particles in the slurry composition comprising PEG and abrasive particles. During a machining process, the temperature of the working slurry is at least 3° C. less, at least 4° C. less, at least 5° C. less, at least 6° C. less, at least 7° C. less, at least 8° C. less, at least 9° C. less, at least 10° C. less, at least 11° C. less, at least 12° C. less, at least 13° C. less, and even 14° C. less than the temperature of a slurry composition comprising at least 60 volume percent polyethylene glycol and abrasive particles at solids content 20 volume percent.

As should be understood, volume percents as referred herein with respect to a particular composition are based on total volume of that composition. Also, as referred to herein, viscosity values are as determined at 25° C. Suitably, viscosity values are measured using a Brookfield spindle (e.g. #2 or #4) at 60 rpm.

Other aspects and advantages of the invention will become apparent from the following description, taken in conjunction with the accompanying drawings, illustrating the principles of the invention by way of example only.

DESCRIPTION

Figure 1:
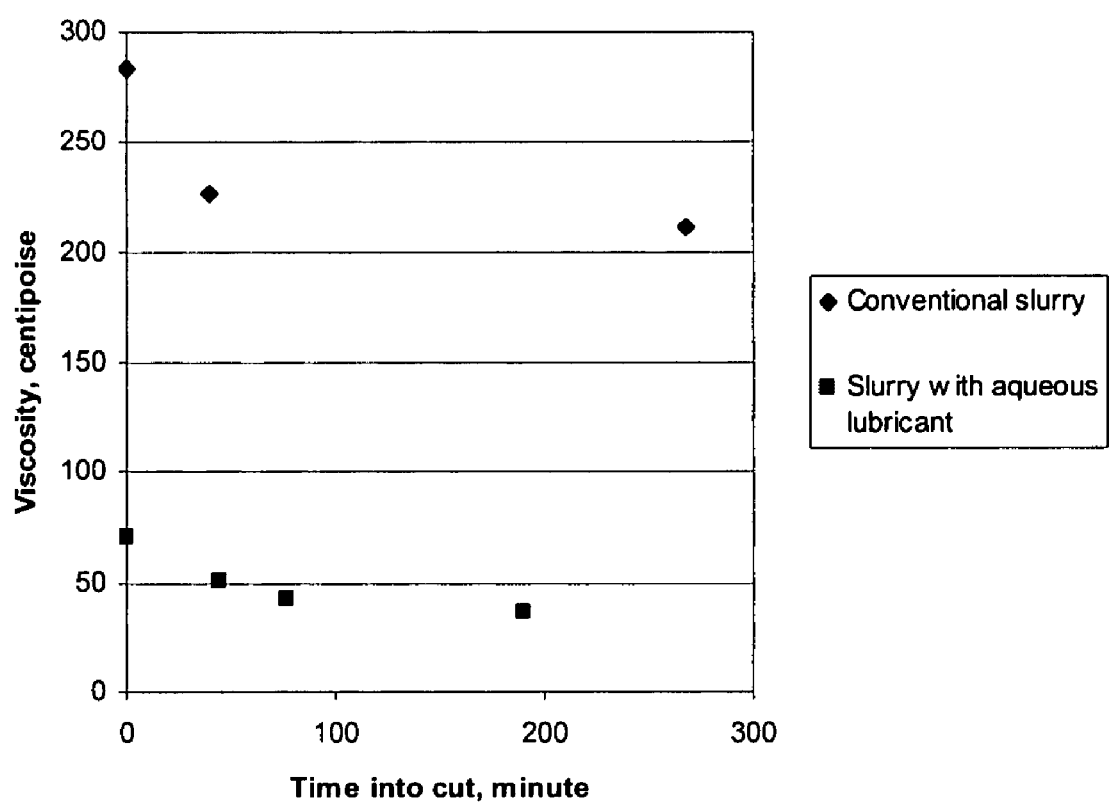
FIG. 1 depicts viscosity profiles of test samples of Example 2, which follows.

The fluid compositions provided by the present invention are suitable for use in various loose-abrasive machining processes including wire sawing, ultrasonic machining, water-jet cutting, and sandblasting. Such processes can be used to cut and machine a variety of materials including, but not limited to, silicon, semiconductor materials such as sapphire, GaAs, InP, and SiC, optical materials such as quartz glass and crystal, and hard and brittle materials such as ceramics. The disclosure to follow should be construed as illustrative rather than in a limiting sense. For example, while certain combinations of materials and concentrations may be provided, such combinations of materials and concentrations are based on wire saw cutting, and could be suitably modified for other types of loose-abrasive machining processes and for cutting and machining various materials.

When referring to percentages of the various components herein, unless otherwise indicated, all percentages refer to volume %, and are based on total volume of the concentrated slurry composition.

The fluid compositions of the present invention comprise one or more water soluble glycol. Any conventional water soluble glycols suitable for loose-abrasive machining slurries can be used in the practice of the present invention. These glycols include, but are not limited to, polyethylene glycol (PEG), ethylene glycol, and polyoxyethylene glycol. In one embodiment, the glycol is PEG.

The water soluble glycol is generally contained in the fluid compositions in amounts ranging from about 15 vol % to about 80 vol %, based on total volume of the fluid composition. In some embodiments, the fluid compositions contain from about 20 vol % to about 75 vol % glycol, in some embodiments from about 25 vol % to about 70 vol %, in some embodiments, from about 30 vol % to about 65 vol %, in some embodiments from 35 vol % to about 60 vol %, and in some embodiments from about 40 vol % to about 55 vol %.

The fluid compositions further comprise water. In some embodiments, deionized water is used, which has very low conductivity. It is believed that the use of deionized water will assist in keeping the conductivity of the slurry low such that it does not interfere with wire breakage alarm systems used with most wire saws.

Addition of water to the fluid compositions alters the viscosity of the fluid compositions and, thus, the amount of water contained in the fluid compositions can be selected so as to provide a desired viscosity. In some embodiments, water is added to the fluid compositions in an amount that provides the fluid composition with a viscosity suitable for thin wafer slicing using a wire saw. In some embodiments, water is contained in the fluid compositions in an amount that effectively reduces or minimizes potential wafer breakage when slicing thin wafers, such as those below 250 microns.

In particular, conventional water soluble slurry compositions, which predominantly contain a water soluble glycol (e.g. PEG), have high viscosities that lead to increased drag forces on the wafer. The present fluid compositions provide decreased viscosities when compared with conventional water soluble glycols. For example, when comparing a conventional PEG slurry to the present fluid compositions, wherein the conventional PEG slurry and present fluid compositions both contain the same abrasive particles at the same solids concentration, the slurries formed using the present fluid compositions possess a lower viscosity. Further, even when the slurries formed using the present fluid compositions contain abrasive particles of finer grit size than those used in conventional slurries, the slurries formed using the present fluid compositions still possess a lower viscosity.

In some embodiments, slurries formed using the present fluid compositions possess a viscosity that is at least 1.5 times less than conventional slurries and, in some embodiments, up to about 10 time less than conventional slurries, wherein the same types of abrasive particles are used at the same solids content, and wherein the grit size of the abrasive particles dispersed within the present fluid compositions is greater than, the same, or less than that of the particles dispersed within the conventional slurries. For example, conventional slurries generally have viscosities ranging from about 200-300 cp. The present slurries can have viscosities as low as about 30 cp or less, 40 cp or less, 50 cp or less, 60 cp or less, 70 cp or less, 80 cp or less, 90 cp or less, 120 cp or less or 150 cp or less. The present slurries may suitably have viscosities from 30 cp to 150 cp, or from 30 cp to 100 cp.

Further, when performing loose-abrasive machining using slurries formed with the present fluid compositions, slurries formed with the present fluid compositions are better able to provide lower viscosities than conventional slurries as the machining progresses. This low viscosity is provided without causing solids settling.

The addition of water to the fluid composition can further assist in dissipation of heat during a machining process. In some embodiments, water is added to the fluid compositions in an amount that effectively contributes to dissipation of heat during wire saw cutting. As the wire saw cuts the workpiece, water evaporates in the cutting zone, thereby dissipating heat and reducing heat related stress on the workpiece. As water is evaporated, it can be easily replenished as needed. By reducing heat related stress on the workpiece and cut pieces, warpage of cut pieces and breakage during cutting will be reduced.

For example, while conventional slurries provide poor and, at best, adequate heat dissipation during a machining process, the present fluid compositions, when used to form working slurries, provides enhanced heat dissipation. In some embodiments, when conventional slurries and slurries formed using the present fluid compositions are used in machining processes under similar conditions, the slurries formed using the present fluid compositions provide temperatures during the process that are at least 2° C. lower than and up to 14° C. lower than conventional slurries formed with PEG. For example, when using conventional slurries in a machining process, the slurries are generally added to the process at room temperature (22° C.). During the process, conventional slurries can reach temperatures as high as 36° C. In some processes, a chiller is used to take heat out of the system and, during such processes, the temperature of conventional slurries can, in some cases, be kept between about 28° C. and 30° C. However, the temperature of conventional slurries, even when a chiller is used, can sometimes still reach 36° C. during a process. Thus, the temperature of conventional slurries can increase by up to 14° C. during the process. During a machining process in which slurries formed using the present fluid compositions are utilized, when the slurries are added to the process at room temperature (22° C.), the temperature of the slurries can be maintained within about 5° C. of room temperature, in some embodiments within about 4° C., and in some embodiments within about 3° C., in some embodiments within about 2° C., and in some embodiments within about 1° C. In certain embodiments, the temperature of slurries formed using the present fluid composition are maintained at room temperature (22° C.) during a process.

In accordance with the present invention, the fluid compositions contain from about 20 vol % to about 85 vol % water. In some embodiments, the fluid compositions contain from about 25 vol % to about 80 vol % water, in some embodiments from about 30 vol % to about 75% water, in some embodiments from about 40 vol % to about 70 vol % water, and in some embodiments from about 50 vol % to about 60 vol % water.

The fluid compositions can further include one or more viscosity modifier. Any conventional viscosity modifiers for use in abrasive slurries can be used, such as, for example, synthetic clay, natural clay, silicas, Carbopols® (also referred to as carbomer, and having a chemical formula of $C_3H_4O_2$), carboxymethylcellulose. ethylcellulose, gelatin, hydroxyethylcellulose, hydroxypropyl cellulose, methylcellulose, polyvinyl alcohol, and xanthan gum. One example of a synthetic clay useful in the practice of the present invention is Laponite®, a synthetic layered silicate (hydrous sodium lithium magnesium silicate). The viscosity modifiers can be added in amounts that alter the viscosity of the fluid compositions as desired.

When added, one or more viscosity modifier is contained in the fluid compositions in amounts up to about 10 vol %. In some embodiments, the fluid compositions contain up to about 5 vol % of one or more viscosity modifier, and in some embodiments up to about 1 vol %. In other embodiments, the fluid compositions contain from about 0.1 vol % to about 10 vol % of one or more viscosity modifier, in some embodiments from about 0.2 vol % to about 5 vol %, in some embodiments from about 0.3 vol % to 4 vol %, and in some embodiments from about 0.3 vol % to about 2 vol %.

The fluid compositions can further include one or more activator. Any conventional activators for use in abrasive slurries can be used such as, for example, amine borate and triethanolamine. The activators are generally used in conjunction with viscosity modifiers, but can be added with or without the addition of viscosity modifiers. The activator is generally added in an amount that will enable the viscosity modifier to set up a matrix in the fluid. This matrix will increase the yield stress or the overall dynamic viscosity of the fluid. Many activators, such as triethanolamine, provide additional benefits, such as corrosion inhibition, and may be used in excess of the amount need for activation of the viscosity modifier. For example, in some embodiments, up to about 5 vol % of one or more activator is added. These multi-functional activators may be used without a viscosity modifier when their additional benefits are desired.

The fluid compositions can further include one or more fungicide. Any conventional fungicides used in loose-abrasive machining slurries can be used. The fungicides are generally added in an amount effective in minimizing or controlling fungal growth. For example, in some embodiments, up to about 2 vol % of one or more fungicide is added.

To control bacterial growth, the fluid compositions can further contain one or more biocides. Some biocides can further control fungal growth. These biocides can be selected from any conventional biocides used in loose-abrasive machining slurries, such as Bioban™ P-148, Grotan®, Kathon®, metal omadines or glutaraldehyde. Bioban™ P-148 is available from Dow Chemical Company, and contains the two active ingredients 4-(2-nitrobutyl)-morpholine and 4,4'-(2-ethyl-2-nitrotrimethylene)dimorpholine. Grotan® is 2-[3,5-bis(2-hydroxyethyl)-1,3,5-triazinan-1-yl] ethanol, and has a chemical formula of $C_9H_{21}N_3O_3$. Kathon is 2-octylthiazol-3-one, and has a chemical formula of $C_{11}H_{19}NOS$. Bioides can be added to the present compositions in an amount that is effective in minimizing or controlling bacterial growth and, in some embodiments the biocides can further minimize or control fungal growth. In some embodiments, a mixture of biocides is used to control both bacterial and fungal growth.

When added, one or more biocide is contained in the fluid compositions in amounts up to about 2 vol %. In some embodiments, the fluid compositions contain from about 0.05 vol % to about 2 vol % of one or more biocide, on some embodiments from about 0.06 vol % to about 1.5 vol %, in some embodiments from about 0.07 vol % to about 1 vol %, and in some embodiments from about 0.08 vol % to about 0.5 vol %.

To inhibit corrosion of the loose-abrasive machining parts (e.g. the wires and wire saw), the fluid compositions can further contain one or more rust inhibitor. The rust inhibitors can include any conventional rust inhibitors used in loose-abrasive machining slurries, such as triethanolamine, amine borates, triazoles, silicates or carboxylic salts. The rust inhibitors can be included in the concentrated slurry compositions amounts that effectively inhibit corrosion.

When added, one or more rust inhibitor is contained in the fluid compositions in amounts up to about 5 vol %. In some embodiments, the fluid compositions contain from about 0.1 vol % to about 5 vol % of one or more rust inhibitor, in some embodiments from about 0.2 vol % to about 4 vol %, in some embodiments from about 0.3 vol % to about 3 vol %, in some embodiment from about 0.4 vol % to about 2 vol %, and in some embodiments from about 0.5 vol % to about 1 vol %.

In one embodiment, the fluid composition comprises from about 20 vol % to about 85 vol % water, from about 15 vol % to about 80 vol % PEG, and optionally, one or more of the following components: viscosity modifiers, activators, fungicides, biocides, and rust inhibitors. For example, in one embodiment, the fluid composition contains from about 20 vol % to about 85 vol % water, from about 15 vol % to about 80 vol % PEG, from about 0.1 vol % to about 10 vol % viscosity modifier, from about 0.2 vol % to about 5 vol % activator, from about 0.1 vol % to about 2 vol % fungicide, from about 0.05 vol % to about 2 vol % biocide, and up to 5 vol % rust inhibitor. In an exemplary embodiment, a fluid composition comprises about 53 vol % water, about 44.5 vol % PEG, about 0.4 vol % synthetic clay, about 1.1 vol % activator, about 0.4 vol % fungicide, about 0.1 vol % biocide, and about 0.5 vol % rust inhibitor.

The present invention further comprises a method for preparing fluid compositions suitable for use in forming abrasive slurries. The methods comprise mixing one or more water soluble glycols with water to provide a fluid composition. In accordance with the present methods, from about 15 vol % to about 80 vol % of one or more water soluble glycol is mixed with from 20 vol % to about 85 vol % water to form a fluid composition. In certain embodiments, the water soluble glycol is PEG.

In some embodiments, the methods further comprise adding one or more viscosity modifier to the glycol and water. In accordance with the present methods, up to about 5 vol % of one or more viscosity modifier is added.

In some embodiments, the methods further comprise adding one or more activator to the glycol and water. The activators can be added with or without the addition of viscosity modifiers. In some embodiments, up to about 3% of one or more activator is added. In some embodiments, activators are added in an amount that activates the viscosity modifiers to give the desired viscosity, and methods of the invention comprise adding one or more activator in conjunction with one or more viscosity modifiers. The one or more activators can be added in an amount that enables the viscosity modifier to set up a matrix in the fluid, with the matrix acting to increase the yield stress or the overall dynamic viscosity of the fluid.

In some embodiments, the methods further comprise adding one or more fungicide to the glycol and water. The fungicides can be added with or without the addition of viscosity modifiers, and/or activators. The fungicides are generally added in an amount effective in minimizing and controlling fungi growth. For example, in some embodiments, up to about 2 vol % of one or more fungicide is added.

In some embodiments, the methods further comprise adding one or more biocide to the glycol and water. The biocides can be added with or without the addition of viscosity modifiers, activators, and/or fungicides. The biocides are generally added in an amount effective in minimizing and controlling bacterial growth. Some biocides are further effective in minimizing and controlling fungi growth and, thus, in such circumstances, one or more biocides can be added to effectively minimize and control both fungi and bacterial growth without requiring the addition of one or more fungicides to minimize and control fungi growth. In some embodiments, up to about 2 vol % of one or more biocide is added.

In some embodiments, the methods further comprise adding one or more rust inhibitor to the glycol and water. The rust inhibitors can be added with or without the addition of viscosity modifiers, activators, fungicides, and/or biocides. The rust inhibitors are generally added in an amount effective in inhibiting corrosion. For example, in some embodiments, up to about 5 vol % of one or more rust inhibitor is added.

The thus formed fluid compositions can then be delivered to a customer. When a user wishes to use the fluid composition for a loose-abrasive machining process, the user simply adds and disperses abrasive particles within the fluid compositions to provide a working abrasive slurry. The user can determine how much abrasive particles to add to the fluid composition based on the desired solids content in the resulting slurry by simple calculations. In general, the desired solids concentration in working wire saw compositions ranges from about 20-28 vol % based on total volume of the working wire saw composition. Thus, one can readily determine how much abrasive particles must be added to the fluid compositions obtain the desired working slurry. Any conventional abrasive particles can be added to and dispersed within the present fluid compositions including, but not limited to, silicon carbide (SiC), diamond, and boron carbide ($B_4C$). The present fluid compositions can, thus, be used to form abrasive slurry compositions having any desired solids content and particular properties by addition of the appropriate amounts and types of abrasive particles.

The fluid compositions of the present invention possess a higher water content than conventional fluid compositions. This higher water content provides a number of benefits. The amount of glycols required to provide the composition with a desired viscosity is reduced because additional water can be used in place of some of the glycols for this purpose. Glycols are expensive materials and, thus, reduction in the amount of glycols present in the fluid compositions reduces costs. A reduction in the amount of glycols in the fluid compositions further reduces the impact of problems associated with glycol disposal. For example, it is often required to remove at least a portion of the glycols in used slurry compositions prior to disposal of the used slurry due to disposal restrictions. Because the present compositions contain a smaller content of glycols, this removal or cleaning step is reduced and sometimes can be eliminated completely. Further, water is an excellent heat dissipater and, thus, the use of a high water content in the present fluid compositions provides enhanced heat dissipation. Enhanced heat dissipation improves the slurry's cutting capabilities by providing improved cutting and machining geometry and lowering warp. Still further, glycols tend to increase drag forces on the workpiece during machining which can lead to breakage of machined and cut pieces. By providing a larger amount of water and less glycols in the fluid compositions, viscosity of the fluid compositions and drag forces on the wafer is reduced, thereby reducing breakage of machined and cut pieces.

It has further been found that the decreased viscosity provided by the addition of water in accordance with the present invention can enable reciprocal wire motion. Currently, for example, in the solar industry, unidirectional wire motion is required due to the high viscosity of presently available fluid compositions. By reducing the viscosity of the fluid compositions in accordance with the present invention, reciprocal cutting is possible, which will reduce the required wire usage.

The present invention is further illustrated by the following examples which should not be construed as limiting in any way. The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

EXAMPLE 1

A fluid composition was prepared by mixing 51.67 vol % water, 47.11 vol % PEG, 0.26 vol % Laponite, 1.1 vol % amine borates, 0.1 vol % Bioban P-1487, and 0.54 vol % triethanolamine. The resulting solution was mixed with JIS1200 silicon carbide to make a slurry with 24 vol % solid concentration. The slurry had the following characteristics:

Density: 1.569 g/ml

Viscosity: 48.1 centipoise, measured by Brookfield spindle #2 at 60 rpm.

Conductivity: 50.2 µs pH: 9.05

The slurry was used to slice a 125 mm×125 mm polycrystalline ingot into 250 µm thick-wafers in a wire saw.

EXAMPLE 2

Three conventional silicon carbide slurries (hereinafter "conventional slurries") were formed as set forth in Table 1. The slurries were formed with polyethylene glycol (PEG200) at 22 vol % solids. Each of the slurries was provided with different silicon carbide grit sizes (JIS 800, JIS 1200, JIS 1500).

A fourth silicon carbide slurry composition was formed by adding silicon carbide to the aqueous slurry composition set forth in Example 1 (hereinafter "present slurry"). Silicon carbide having a grit size of JIS 1200 was added to the aqueous slurry composition to form a working slurry composition having 22 vol % solids.

The viscosities of the slurries were measured using a viscometer, #2 spindle, at 60 RPM. These viscosities are set forth in Table 1.

TABLE 1

Viscosity Comparison of Conventional Slurries and Slurries Formed Using an Aqueous Slurry

| Silicon Carbide Grit Size | Viscosity, cps |
|---|---|
| Viscosity of conventional slurries with PEG200 at 22 vol % solids | |
| JIS 800 | 284 |
| JIS 1200 | 307 |
| JIS 1500 | 336 |
| Viscosity of working slurry formed using aqueous slurry composition at 22 vol % solids: | |
| JIS 1200 | 71 |

As clearly demonstrated, the viscosity of the present slurry was much lower than the viscosities of conventional slurries. In particular, the viscosity of the present slurry was at least four times less than the viscosities of conventional slurries using PEG200 at the same solids content. Even with such low viscosity levels, the present slurry was capable of preventing solids settling.

The slurry composition set forth in Table 1 having silicon carbide grit size JIS 800 was then used in a wire saw operation to slice silicon ingots, and the viscosity profile measured during the operation. The working slurry formed using an aqueous slurry composition in accordance with the present invention (Table 1, silicon carbide grit size JIS 1200) was also used in a wire saw operation, and the viscosity profile measured during the operation. The viscosity profiles for the two slurries are set forth in FIG. 1.

The present and conventional slurries had the same solids content. The present slurry clearly demonstrated a much lower viscosity compared to the conventional slurry. The low viscosities provided by the present slurry did not result in solids settling. This lower viscosity is expected to reduce breakage of thin wafers by reducing drag force on the wire.

EXAMPLE 3

Operational Temperature Evaluations

The two slurries set forth in Example 2 (i.e. "present slurry" with aqueous content and "conventional slurry" with high PEG content) and referred to in FIG. 1 were then used to cut 125 mm square silicon ingots for solar wafer cells using an ETCH CT Wiresaw.

Figure 2:
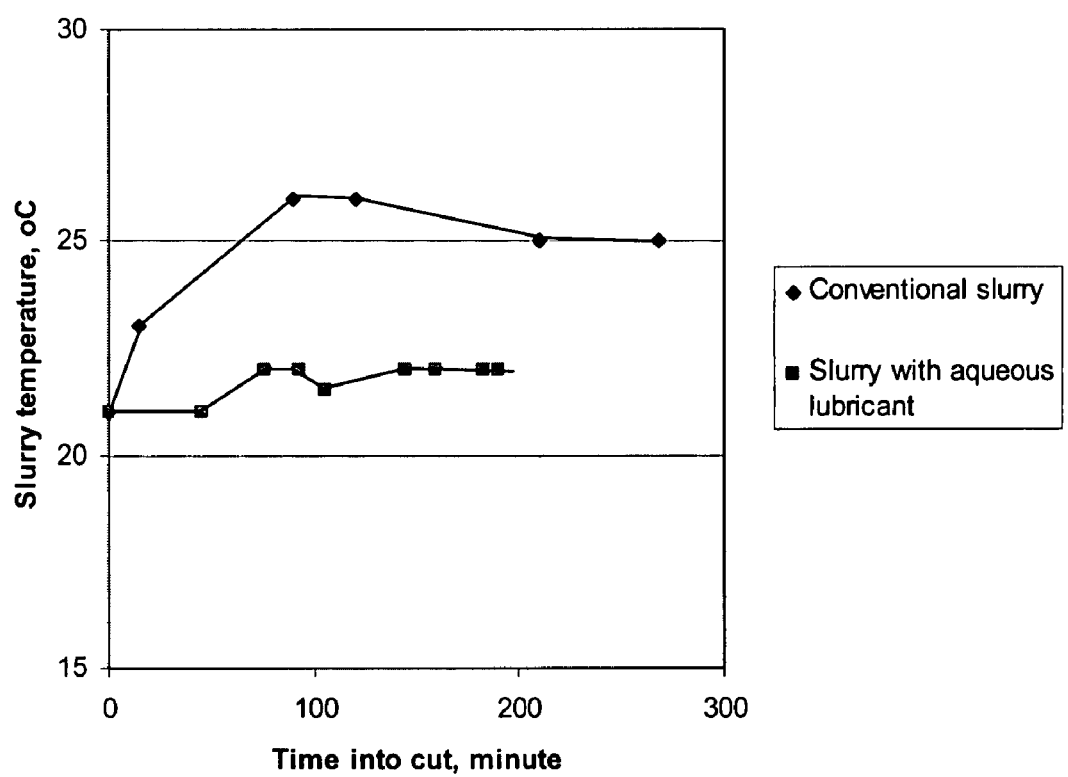
FIG. 2 depicts temperature profiles of test samples of Example 3, which follows.

It was shown that the present slurry dissipates more heat than the conventional slurry. Results are set forth in FIG. 2. Both slurries were provided at room temperature prior to cutting and underwent the same running conditions. Throughout the process, under the same running conditions (e.g. wire speed and rate of cutting), the present slurry ran 3-4° C. lower than the conventional slurry. Further, while the conventional slurry increased to a peak in temperature by at least 5° C. during the cutting process, the present slurries remained within about 2° C. throughout the cutting process. This decreased temperature profile, provided by the present slurry, can reduce thermal stresses on the wafers, resulting in lower warpage of the wafers, and will also reduce breakage or cracking rate for thin wafers.

Although a number of embodiments of the present invention have been described, it will become obvious to those of ordinary skill in the art that other embodiments and/or modifications, combinations, and substitutions of the present invention are possible, all of which are within the scope and spirit of the disclosed invention.

What is claimed is:

1. A carrier composition for use in forming a loose-abrasive machining slurry consisting essentially of:
    polyethylene glycol (PEG);
    water; and
    one or more viscosity modifiers, and/or one or more activators,
    wherein the composition comprises about 15 vol % to about 80 vol % of polyethylene glycol (PEG) and about 20 vol % to 85 vol % water, and wherein the viscosity of the composition ranges from about 5 cps to about 100 cps measured at 25° C.

2. The composition of claim 1 comprising about 20 vol % to about 75 vol % PEG.

3. The composition of claim 1 wherein the water is deionized.

4. The composition of claim 1 wherein the composition includes one or more viscosity modifiers selected from synthetic clay, natural clay, Carbopols®, carboxymethylcellulose, ethylcellulose, gelatin, hydroxyethylcellulose, hydroxypropyl cellulose, methylcellulose, polyvinyl alcohol, and xanthan gum.

5. The composition of claim 4 wherein the composition contains up to about 10 vol % of one or more viscosity modifier.

6. The composition of claim 1 wherein the composition includes one or more activator selected from triethanolamine and amine borate.

7. The composition of claim 6 wherein the composition contains up to about 5 vol % of one or more activator.

8. The carrier composition of claim 1 suitable for use in reciprocal cutting by a wire saw.

9. A method for forming a carrier composition for use in forming a loose-abrasive machining slurry comprising:
    forming a mixture consisting essentially of:
    polyethylene glycol;
    water; and
    one or more viscosity modifiers and/or activators;
    wherein water is added such that composition contains about 15 vol % to about 80 vol % of polyethylene glycol (PEG) and about 20 vol % to 85 vol % water, and wherein the viscosity of the composition ranges from about 5 cps to about 100 cps measured at 25° C.

10. A carrier composition for use in forming a loose-abrasive machining slurry comprising:
    about 15 vol % to about 80 vol % of polyethylene glycol (PEG) and about 20 vol % to 85 vol % water; and
    one or more viscosity modifiers and/or one or more activators,
    wherein a loose-machining slurry formed by dispersing from about 20 vol % to about 28 vol % abrasive particles within the carrier composition has a viscosity measured at 25° C. that is about 150 cp or less.

11. The carrier composition of claim 10 wherein the viscosity is about 120 cp or less.

12. The carrier composition of claim 10 wherein the viscosity is about 90 cp or less.

13. The carrier composition of claim 10 wherein the viscosity is about 60 cp or less.

14. The carrier composition of claim 10 wherein the viscosity is about 40 cp or less.

15. The carrier composition of claim 10 wherein the viscosity is about 30 cp or less.

16. A loose-abrasive machining slurry comprising:
    a carrier composition comprising about 15 vol % to about 80 vol % of polyethylene glycol (PEG) and about 20 vol % to 85 vol % water; and one or more viscosity modifiers and/or one or more activators; and about 20 vol % to about 28 vol % abrasive particles dispersed within the carrier composition, wherein the slurry has a viscosity measured at 25° C. that is about 150 cp or less.

17. The slurry of claim 16 wherein the viscosity is about 120 cp or less.

18. The slurry of claim 16 wherein the viscosity is about 90 cp or less.

19. The slurry of claim 16 wherein the viscosity is about 60 cp or less.

20. The slurry of claim 16 wherein the viscosity is about 40 cp or less.

21. The slurry of claim 16 wherein the viscosity is about 30 cp or less.

22. The slurry of claim 16 having a pH of about 12.

23. A carrier composition for use in forming a loose-abrasive machining slurry consisting of:

polyethylene glycol (PEG) and water; and one or more viscosity modifiers, and/or one or more activators, wherein the composition comprises about 15 vol % to about 80 vol % of polyethylene glycol (PEG) and about 20 vol % to 85 vol % water, and wherein the viscosity of the composition ranges from about 5 cps to about 100 cps measured at 25° C.

24. The composition of claim 23 comprising about 20 vol % to about 75 vol % PEG.

25. The composition of claim 23 wherein the one or more viscosity modifiers are selected from synthetic clay, natural clay, Carbopols®, carboxymethylcellulose, ethylcellulose, gelatin, hydroxyethylcellulose, hydroxypropyl cellulose, methylcellulose, polyvinyl alcohol, and xanthan gum.

26. The composition of claim 23 wherein the composition contains up to about 10 vol % of one or more viscosity modifier.

27. The composition of claim 23 wherein the one or more activators are selected from triethanolamine and amine borate.

28. The composition of claim 23 wherein the composition contains up to about 5 vol % of one or more activator.

* * * * *